United States Patent [19]

Aughenbaugh

[11] Patent Number: 6,002,984
[45] Date of Patent: Dec. 14, 1999

[54] METHOD AND SYSTEM FOR ENABLING USE OF CURRENT INFORMATION ABOUT FARMING DATA

[76] Inventor: Timothy A. Aughenbaugh, R.R. 1, Iroquois, S. Dak. 57353

[21] Appl. No.: 09/072,442

[22] Filed: May 4, 1998

[51] Int. Cl.[6] ........................................... G06F 19/00
[52] U.S. Cl. ............................................................. 702/2
[58] Field of Search ............................ 702/2, 5; 706/928, 706/930; 701/23–27; 209/3.3; 340/825.49, 870.07, 870.09; 342/457

[56] References Cited

U.S. PATENT DOCUMENTS

| | | | |
|---|---|---|---|
| 4,399,821 | 8/1983 | Bowers | 340/573.2 |
| 4,656,463 | 4/1987 | Anders et al. | 340/573.4 |
| 5,173,855 | 12/1992 | Nielsen et al. | 364/528.19 |
| 5,257,011 | 10/1993 | Beigel | 340/825.34 |
| 5,322,034 | 6/1994 | Willham et al. | 340/573.3 |
| 5,566,069 | 10/1996 | Clark, Jr. et al. | 702/2 |

OTHER PUBLICATIONS

1994 Catalogue from Dallas Semi Conductor, pp. 1–92.

Primary Examiner—Donald E. McElheny, Jr.
Attorney, Agent, or Firm—Craig J. Lervick

[57] ABSTRACT

The present invention is a method and system for enabling farmers and producers to record, store and retrieve information about production data related to farming to utilize in managing crops and evaluating crop yield and characteristics.

10 Claims, 6 Drawing Sheets

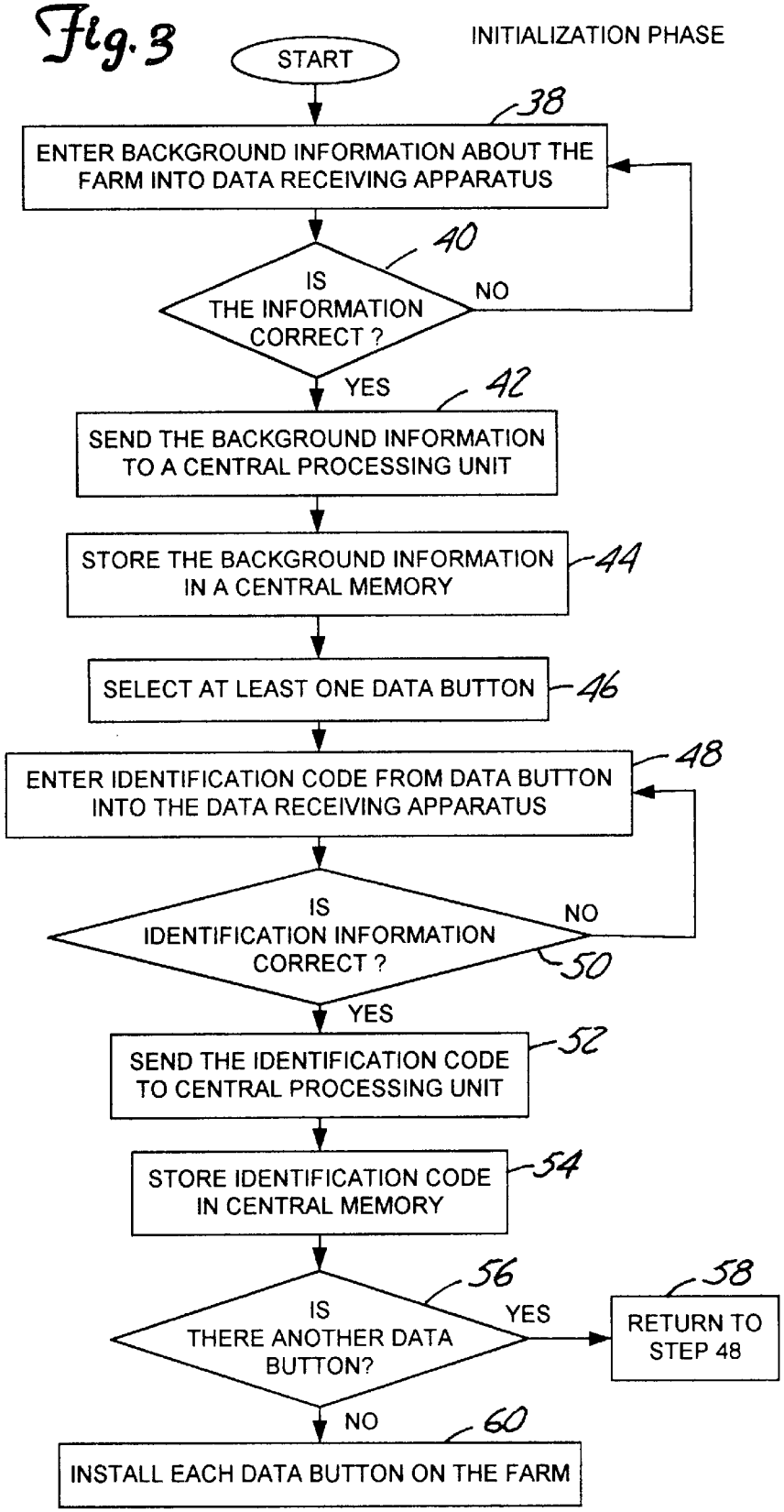

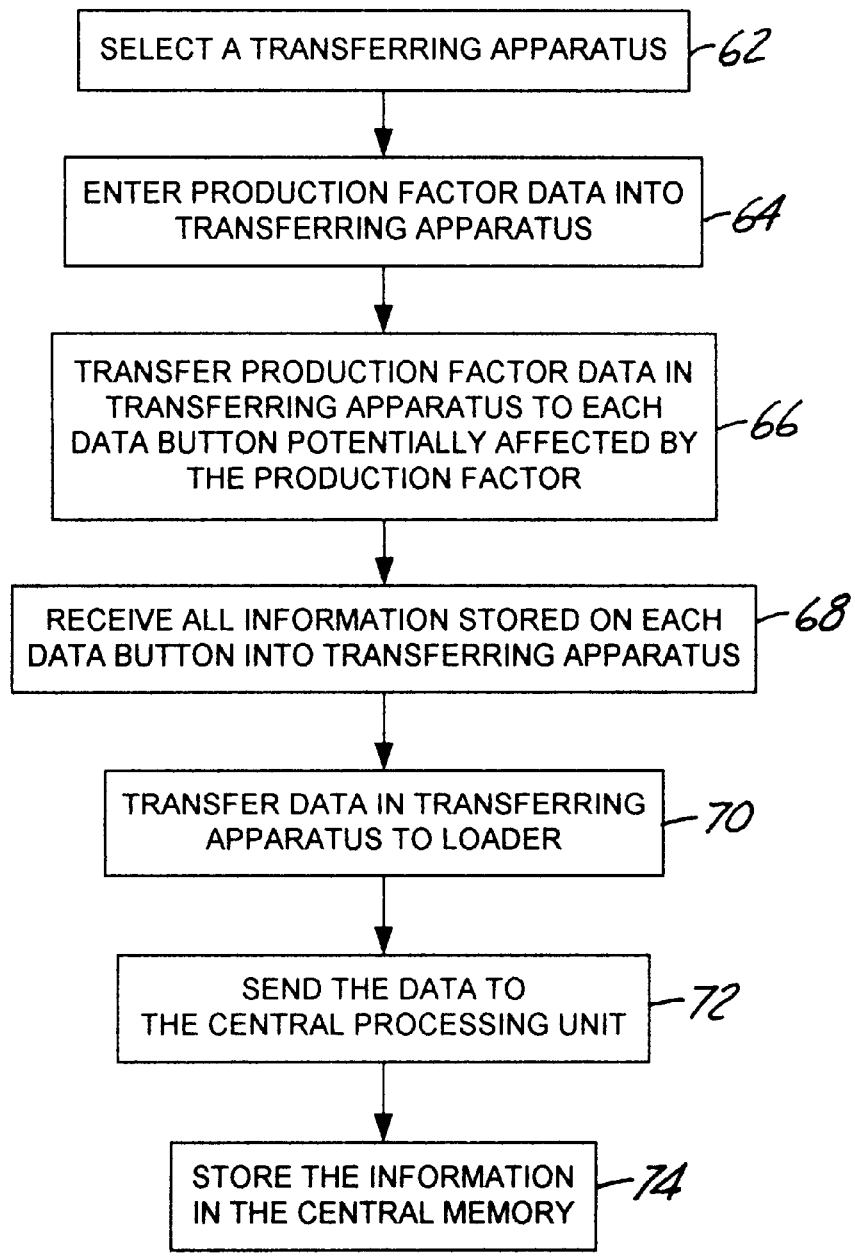

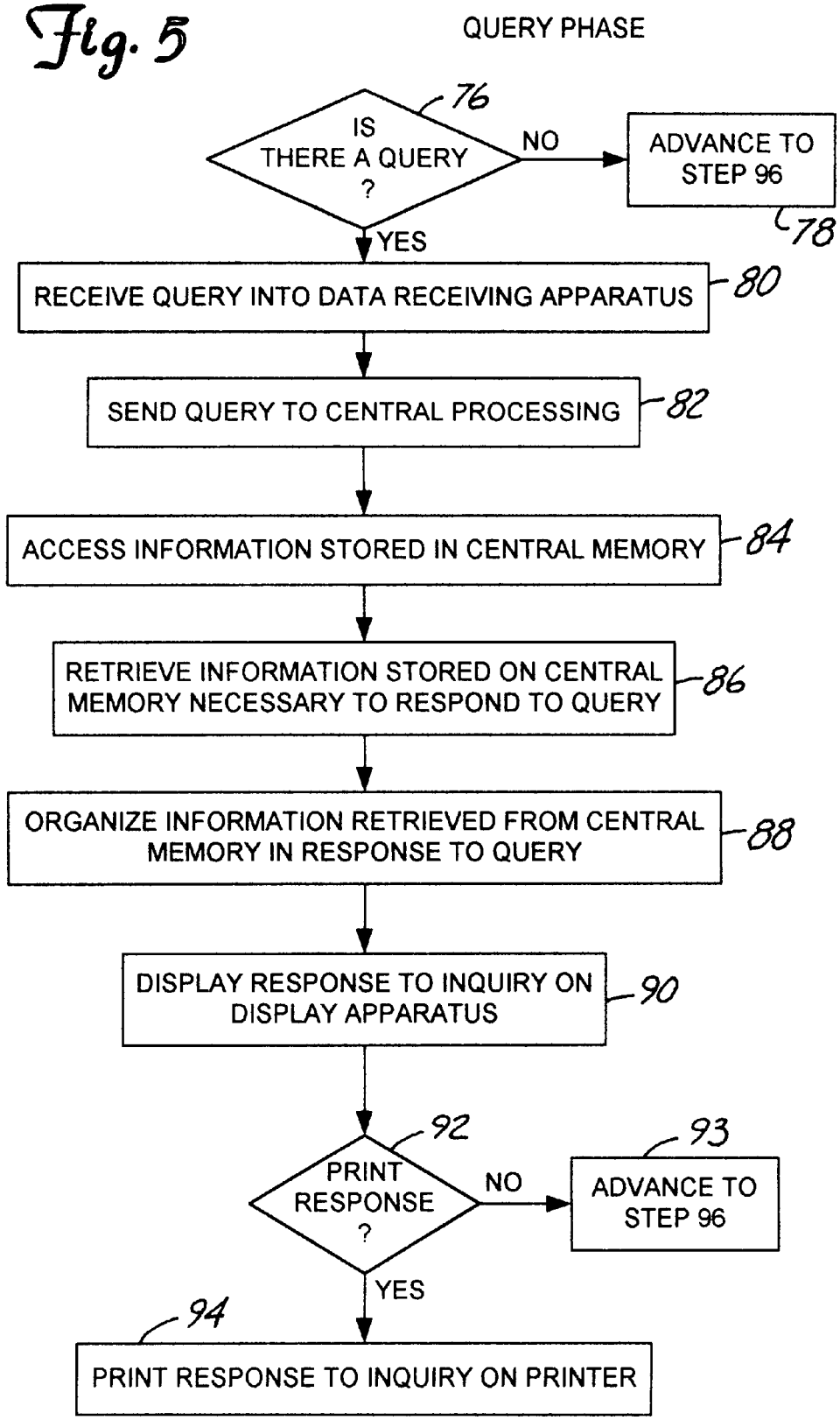

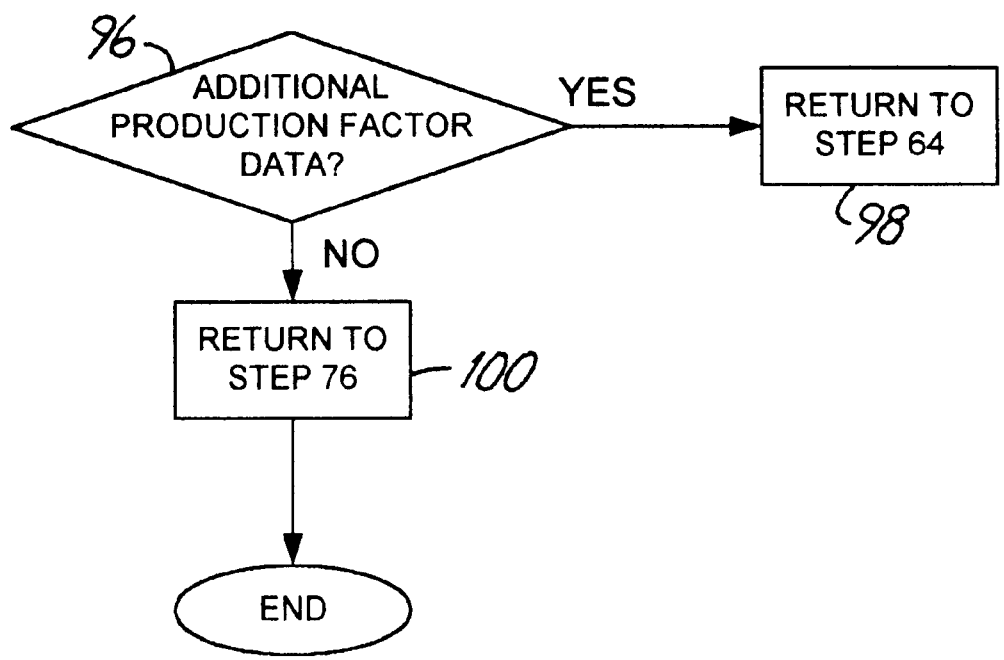

METHOD AND SYSTEM FOR ENABLING USE OF CURRENT INFORMATION ABOUT FARMING DATA

BACKGROUND OF THE INVENTION

The present invention relates to a method and system for enabling farmers and producers to record, store and retrieve information about production factor data. More specifically, the system and method of the present invention manages data related to farming that can be used in managing crops, evaluating yields and tracking crop characteristics.

Numerous production factors such as tillage practices, pesticides, herbicides, fungicides, fertilizers, soil conditions and weather conditions can influence crop yield and characteristics. Farmers can better manage the crop and perhaps increase crop yield and certain characteristics of the crop, such as increased oil content or sugar content, if they can evaluate a wide variety of production factors data on a current and historical basis. Presently, monitoring of the production factors on a farm is difficult, time consuming and, in most cases, not very cost effective. In order to attempt to record data about production factors for purposes of managing farm practices and evaluating crop yield and characteristics, farmers or producers have to physically enter information, i.e., data, onto an item such as a notepad or notebook each time the farmer or producer encounters a production factor. During the life cycle of a crop, dozens to perhaps hundreds of various production factors occur that need to be recorded to create an accurate history of the various production factor events that may influence crop yield and characteristics. The process of recording and organizing all of this information physically by hand is a daunting task. Many farms are spread across hundreds, even thousand of acres of land. Farmers cannot physically travel during a day to inspect every field, worker and piece of equipment on the farm. In addition, activities such as spraying pesticides, herbicides and fungicides are conducted by independent contractors. Furthermore, dozens to perhaps hundreds of workers may perform activities on a regular basis that can influence crop production. To accurately record the hundreds of various potential production factors, farmers must be able to record the factors out in the field. Waiting to record information when a farmer returns to the office is not practical as there are simply too many events to accurately remember. In addition, because farmers cannot observe all production factors, they will have to depend on numerous workers to relay production factor information. Thus, not only is the sheer number of production factors nearly impossible to record, the likelihood of a significant error occurring is almost a certainty. Currently, to record information out in the field, farmers must use notebooks or notepads. Separate files, however, whether they be charts, documents, spreadsheets or notebooks, are needed for each production factor, e.g., a notebook for rain, one for pesticides, one for herbicides, and so on. The practicality of the notepad is restricted by location and weather. During inclement weather, the notebooks can be damaged. In addition, compiling the hand recorded information into a meaningful and useful product after the crop is harvested is extremely difficult.

Because of the high cost in both time and money in monitoring production factors for a specific crop, a producer or farmer is normally limited, or restricts himself, to collecting data on a minimal sample basis. That is, in order to gather data regarding production factors influencing a crop, the farmer will limit his data collection to historical data about only a few production factors. Similarly, the producer will normally select only one or two farms in an area to be evaluated. This limitation results in the farmer not being able to monitor a wide range of production factor data. In addition, because of the limitations of the current recordation methods, it is not possible for a farmer to acquire real-time or near real-time information about the production factors in an efficient fashion other than walking outside and looking at the crop in the field. Even this practice is limited, because a farmer usually cannot observe such factors as soil moisture content or herbicide and pesticide application by simply viewing a crop. Thus, current information about various production factors such as, for example, percent water content in the soil, availability of labor and equipment, and information about the most recent pesticide, herbicide or fungicide application is not readily available to a farmer. Current availability of this information would allow a farmer to quickly evaluate whether irrigation, tilling or spraying is necessary and what the cost would be to the farmer. It would be very desirable to evaluate these conditions without the need of the farmer having to make the numerous inquiries, investigations and assumptions that now have to be made in order to acquire the same information on production factors. Under current production factor recordation systems, the producer is not able to evaluate crop yield and characteristics on a farm-by-farm basis for an entire region. Because of this limitation, a producer is unable to make concise conclusions and strategic responses regarding the impact of various production factors on crops in a specific geographic region.

The conventional means of recording equipment use and labor and production factors potentially influencing a crop, set forth above, are not desirable. In addition, the conventional means of recording production factors do not provide a farmer or producer with the ability to acquire current information about the wide variety of production factors on a near real-time basis. As mentioned, the present method of physically recording data on a notebook or notepad is laborious, error-prone, time-consuming, costly and ineffective. The conventional methods of recording data are also not practical to use in situations where there is inclement weather. In addition, because of the difficulties in recording and organizing the data, the information collected is not of a quantity or quality that allows for a farmer or producer to evaluate production factor data on a near real-time basis or evaluate and compare crop yields and characteristics.

In view of these difficulties, it is an object of the present invention to provide a method and system for recording production factor data that does not require manual entry of information on notebooks or notepads. It is another object of the present invention to provide a method and system for recording production factor data that allows an operator of the system to acquire near real-time information about the production factors. It is a further object of the present invention to provide a method and system for recording production factor data that allows a farmer to provide access to production factor data out in the field. It is yet a further object of the present invention to provide a method and system for recording production factor data that can record hundreds and even thousands of pieces of information by a single operator of the system.

SUMMARY OF THE INVENTION

The ability to evaluate production factor data on a current basis is invaluable. Current information allows immediate response to production factors possibly affecting crops. For example, tillage practices can be altered, pesticide, herbicide and fungicide spraying can be increased or decreased, and harvesting can be delayed or expedited. In addition, maximum utilization of equipment and labor can be achieved through current information knowledge. Constant transfers of data related to the utilization of equipment will allow a farmer or producer to more effectively allocate resources as to the equipment itself and the labor necessary to operate the equipment. In addition, by storing the production factor data in the field, an individual such as a pesticide or herbicide applicator can retrieve information about the production factors, without having to inquire upon a farmer who may or may not be readily available.

The present invention is a method and system for enabling farmers and producers to record, store and retrieve historical information and production factor data associated with a crop on a farm for managing crops, and evaluating crop yield and characteristics. Specifically, the system comprises a data receiving means for receiving historical or background information and queries, a central processing unit, a central memory, a data button, a data loader, transferring apparatus, and a display apparatus.

Examples of different data receiving means would include a computer keyboard and mouse. The data receiving means would be connected to the central processing unit, or CPU. Preferably, the CPU would be operated by a microchip capable of operating at a speed above 200 megahertz and possess at least 32 megabytes of random access memory. Also connected to the CPU would be the central memory. An example of a central memory would be a hard disk drive. Preferably, the central memory would have a storage capacity of at least 1.0 gigabytes. Data such as background information about the farm would be entered into the data receiving means, processed by the CPU and stored in the central memory. The data buttons would be small electronic data storage devices for receiving data related to the farm. The data buttons would be located on objects throughout the farm, including field posts, buildings, equipment and even people's clothing. Data would be transferred to the data buttons through the transferring apparatus. Preferably, the transferring apparatus would be a hand-held device. The transferring apparatus would be capable of receiving, storing and exporting data. The data loader would be connected to the CPU and would be used to receive data from and export data to the transferring apparatus or data button. Transferring data directly from a data button to the data loader would likely only occur in those instances where the data button is mobile, e.g., attached to a piece of clothing or a clipboard, or before installation of the data button to a fixed or large object. In the most common circumstance where the data button is attached to a fixed object or large piece of equipment, data from the data button would be transferred to the data loader via the transferring apparatus. The display apparatus would be used to display data that is requested by an operator of the present invention. The display apparatus is connected to the CPU. Each of the above elements of the invention is more fully described below.

The present invention eliminates the need for a farmer to manually record production factor information onto a notepad or notebook. All production factor information is recorded electronically by means of the transferring apparatus and at least one data button.

As stated above, the data button, or buttons, would be positioned throughout the farm at appropriate locations. For example, data buttons would be attached to a tractor, tiller, field post adjacent a particular crop, buildings, and workers.

The data buttons would preferably be devices that are capable of storing, receiving and exporting data with a minimum appearance and use of energy. One example of a data button that comprises these characteristics is a Touch Memory Button™ data button sold by Dallas Semiconductor Corp. The data buttons should be rugged and resistant to the extreme environment of the agricultural industry. The data buttons should be made of a durable material such as stainless steel and designed to withstand large temperature ranges and shock loads. Preferably, the data buttons would not have a permanent or remote power source, making installation very cost effective. The data button would receive its energy to store data through energy siphoned off the energy conductively transferred from the transferring apparatus when it is placed in contact with the data button in order to enter or retrieve data. Each data button should, preferably, also be small in size and, therefore, unobtrusive and easily mountable almost anywhere on a piece of equipment or carried on or attached to a worker. The data buttons would be imbedded with a unique identification code. The data buttons would perform such functions as identifying people, location, and items on the farm along with storing production data relating to when the people, locations and equipment perform an activity or cause an event that influences or possibly influences the crop.

Production data such as temperature, precipitation, humidity and winds would be transferred to the data buttons from the transferring apparatus. The data buttons could also be directly attached to such apparatus as thermometers, wind gauges and rain gauges.

The electronic nature of the data buttons allows for the possibility of protecting the data with a password. This eliminates unwanted external personnel from accessing data owned by the producer or farmer. Passwords could be implemented in whole or in part. For instance, a person may be allowed to access the names of products used in production, but disallowed any access to the amount of quantities of those products that was used. Passwords can also be established to allow only the transfer of data as opposed to retrieving data, or vice versa.

The data buttons would be strategically placed around the farm such that critical production factor data is recorded. For example, in order to manage applications, e.g., pesticides, herbicides, fungicides, etc., a data button should, preferably, be located on a field validation post adjacent a planted field. When an applicator approached a field they would first touch a data button associated with the applicator with a transferring apparatus. The applicator would then touch the data button attached to field validation post. This act would register the applicator's identification on the data button. The applicator would then touch the transferring apparatus to a second data button either attached to the respective application product or attached to chart, wherein the data button on the chart is preprogrammed with data associated with the application product. After the data associated with the application product was transferred to the transferring apparatus, the applicator would touch the transferring apparatus to the data button of the post. This act would allow data about the application product to be transferred or copied to the data button. Other data such as time, date, weather or type of equipment used could also be transferred to the data button on the post. At the end of the day, or for any other period of time, the applicator would touch the transferring apparatus to the loader device which would download all of the data transferred by the transferring apparatus. During the course of a growing season, hundreds to thousands of these data transfers would take place.

Each data button includes a microchip for storing identification, location and other historical data relating to the attached object or apparatus Production factor data is recorded and stored in the data button, preferably by an electrical transferring means. Preferably, because of greater mobility and less cost, a hand-held electrophysical transferring device would be used. An example of such an electrophysical transfer of data would be a hand-held data transferring apparatus such as a Touch Pen™ manufactured by Dallas Semiconductor Corp.

The production factor data stored in all of the data buttons is transferred to the central memory. The information stored on the central memory is available to an operator of the system, such as a farmer, upon a simple request entered through the data receiving apparatus. The data stored on each data button is also readily available to any individual with a transferring apparatus. For example, a farmer, applicator or worker can retrieve information stored on an electronic storage device attached to a field post adjacent a crop to acquire information about the crop such as when it was last fertilized, tilled or sprayed for pests.

At the time of harvest, the data related to the production factors can also be downloaded from the computer into a data button attached to a vessel or container that holds the harvested crop, e.g., truck or railway car. The harvested crop and associated container would be delivered to a distributor that retrieves the data stored in the data button attached to the container and downloads it onto a second memory connected to a second processor located at the producer's facility. Alternatively, the farmer can provide data to the producer through a conventional memory storage device such as a diskette. The distributor typically retrieves samples of the harvested crop from the container upon arrival. The distributor analyzes the characteristics of the crop sample and then can compare this information with the production factor data retrieved from the corresponding data button or diskette. The data is then compiled to determine correlations and potential relationships between various production factors and crop yield and characteristics.

Each farmer, utilizing the present invention will have data on the production factors potentially influencing crop yield and crop characteristics. As the producer or distributor receives this information from the various farms, the producer can begin to evaluate potential relationships between certain production factors and certain crop yield and characteristics. Crop yields and characteristics and production factors at one farm can be compared with production factors and crop yields and characteristics at another farm to determine potential relationships between various factors, yield and characteristics. In addition, comparisons for determining relationships between production factors and crop yield and characteristics can also be made between production factor data collected one year with data collected during another year.

The present invention is an improvement over conventional methods of recording data related to production factors on notebooks or by other manual means because of the present invention's ability to provide current information about production factors, and ability to be set up with relative ease, with little or no maintenance, at a very low cost, and operated with little physical involvement.

Because of the low cost and ease of use of the present invention, hundreds of thousands of farms can be implemented with the present invention. The entire farming industry can become one giant laboratory. This was not possible with the conventional method of recording data on notepads or notebooks.

The data buttons have two improved main capabilities. First, they can all be manufactured to have a unique serial number that cannot be changed. When attached to an article of clothing or piece of equipment, this capability allows for the unique identification of the person wearing the clothing or operating the equipment. Secondly, the data buttons allow information to be stored at various times. Thus, a flexibility is achieved for different activities.

A data button attached to an individual may be designed only to contain the unique serial number that identifies the individual if this is all the information the producer desires about the individual. On the other hand, the data button, for example located on a field validation post, would be designed to have storage capabilities to continually receive data during the life cycle of a crop.

Although the system of using data buttons has been described, other possible devices such as bar codes, magnetic strips, device cards and RF tags can be considered possible alternatives.

The present invention has been described as a method and system for enabling farmers and producers to record, store and retrieve historical information and production factor data associated with a farm for managing crops, and evaluating crop yield and characteristics. In addition to the application of data buttons on various individuals, field validation posts and equipment, with production factor data being downloaded into the data buttons, other variations as to what production factors to be recorded and modifications to the steps involved may be made to the invention described herein without deviating from the scope and spirit of the invention.

BRIEF DESCRIPTION OF THE DRAWINGS

The above-mentioned objects and advantages can be more clearly seen by referring to the following detailed description and the drawings in which:

FIG. 3 is a flow diagram of another embodiment of the present invention;

FIG. 4 is a continuation of the flow diagram illustrated in FIG. 3;

FIG. 5 is a continuation of the flow diagram illustrated in FIG. 4; and

FIG. 6 is a continuation of the flow diagram illustrated in FIG. 5.

DESCRIPTION OF THE INVENTION

Figure 1:
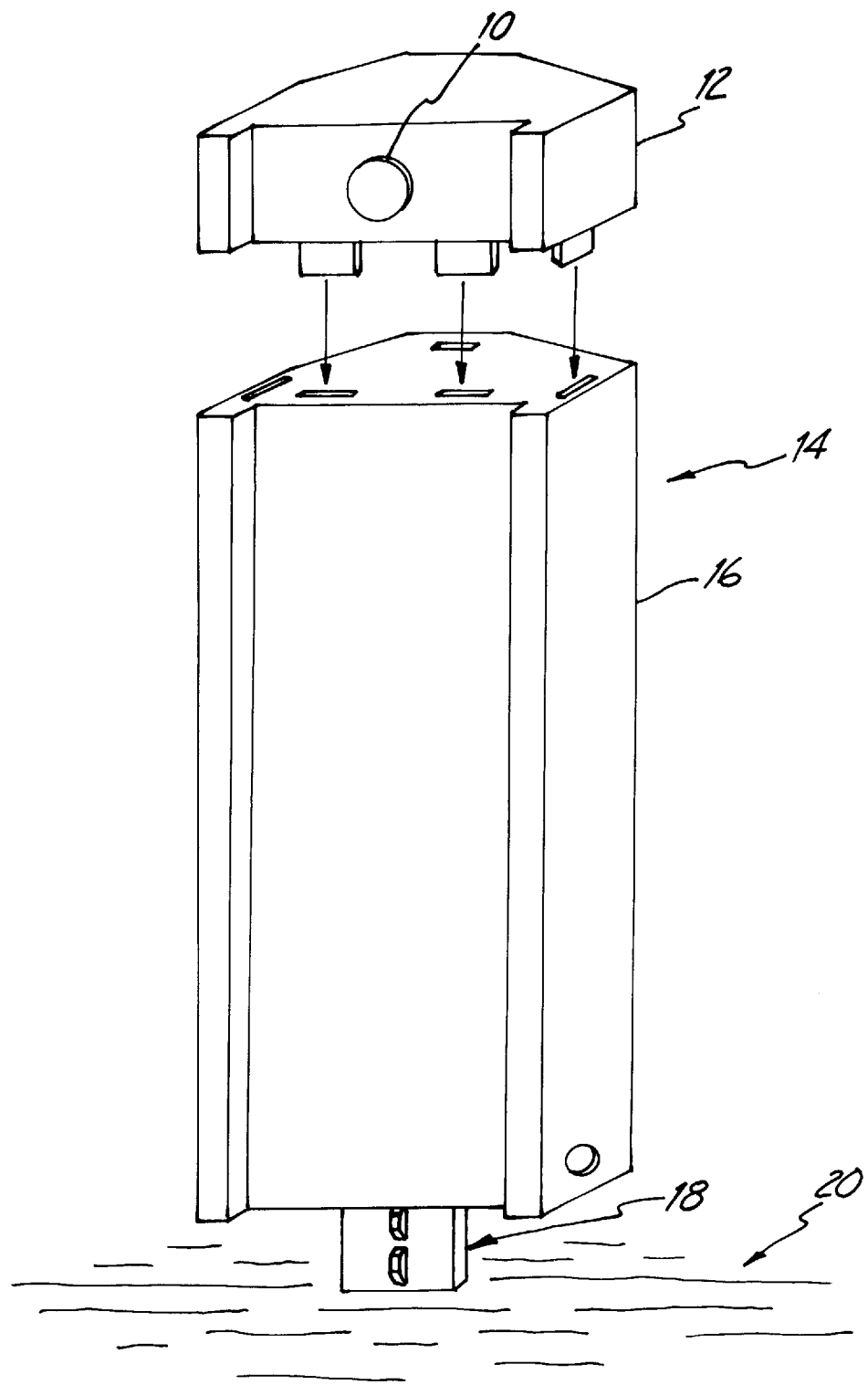
FIG. 1 is a front elevational view of an electronic data storage device attached to a module that releasably engages a field validation post.

Referring now to FIG. 1 which shows a front elevational view of a data button 10 attached to a module 12 that releasably engages a field validation post 14. For convenience, like numbers have been used to identify like parts. Field validation post 14 comprises a sleeve 16 that slideably, releasably engages a fence post 18 that is secured in a ground 20.

Figure 2:
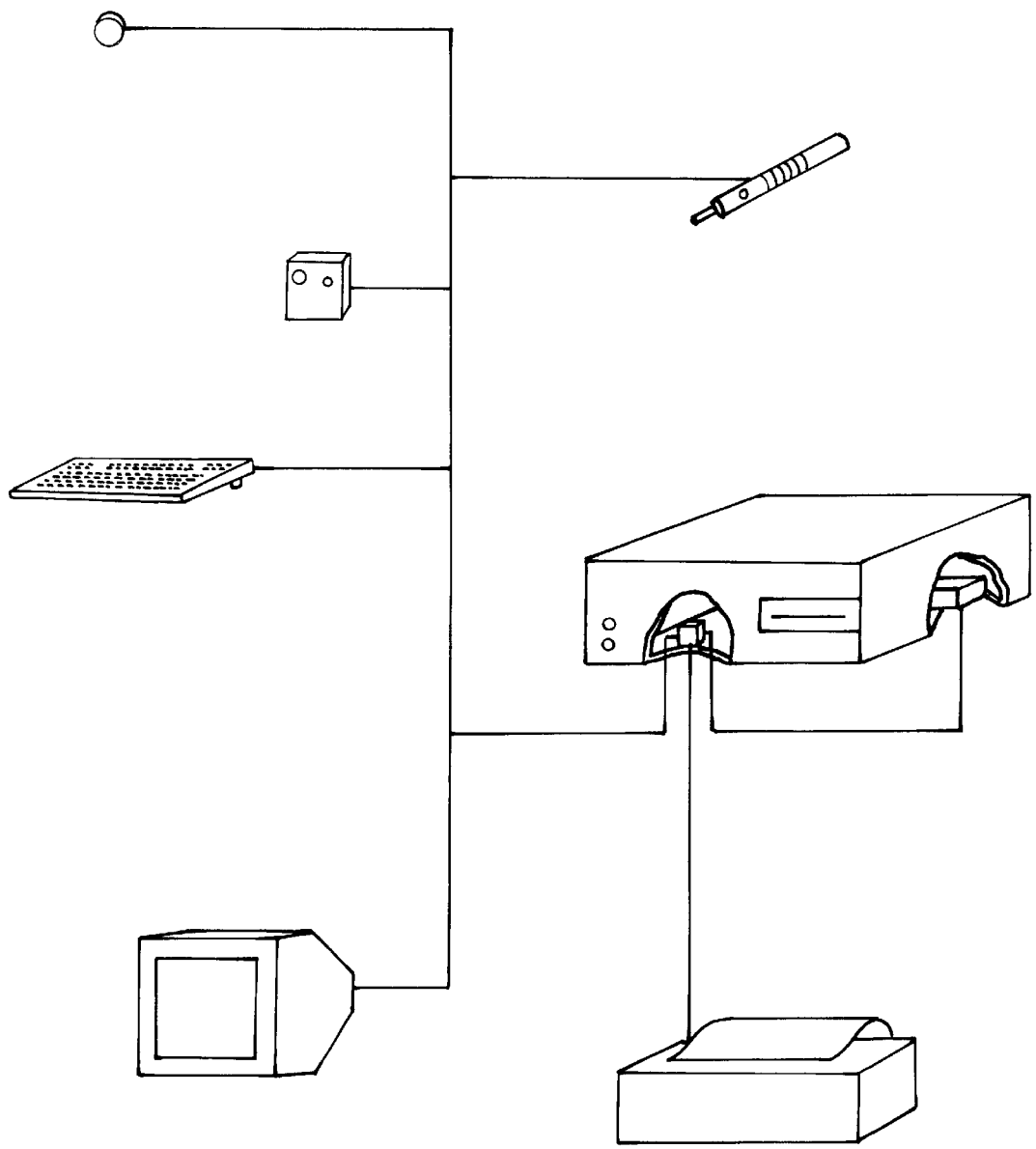
FIG. 2 is a schematic drawing of one embodiment of the system of the invention.

Referring now to FIG. 2, there is shown a schematic diagram of one embodiment of the invention. FIG. 2 depicts a data receiving apparatus 22, such as a standard keyboard or mouse connected to a central processing unit 24, or CPU, housed in a computer housing 26. CPU 24 is connected to a central memory 28, which is also housed in computer housing 26. A loader 30 is also shown, which is connected to CPU 24. A display apparatus 32, connected to CPU 24 is also shown. Also connected to CPU 24 is a printer 34. A transferring apparatus 36, here shown embodied as a hand-held, portable, electro-physical device, is also shown. Data button 10 is also shown as part of one embodiment of the invention. Many of these components can easily be recognized as standard computer components that are readily available.

Referring now to FIG. 3, there is shown a flow diagram outlining the invention showing the steps of the method of the present invention. In the method of the present invention, at step 38, information is entered about the farm into data receiving apparatus 22. Such information would include, but would not be limited to, the following: 1) name of the farm; 2) address of the farm; 3) name of the owner of the farm; 4) size of the farm; 5) longitude and latitude of the farm; 6) names of employees on the farm; 7) types of equipment on the farm; 8) types of crops to be grown on the farm; 9) location of the crops; and 10) name of producer of crop. Step 40 involves verifying the information that was entered in step 38. CPU 24 sends a request to the operator as to whether the information entered in step 38 is correct. If the information is incorrect, CPU 24 returns the program to step 38 to enter the correct information. In step 42, the information entered in step 38 is processed by CPU 24 and then, in step 44, sent to be stored in central memory 28.

In step 46 selection of at least one data button 10 that will be installed on the farm occurs. The total number of data button 10s to be utilized on the farm depends on, but is not limited to, such factors as: size of the farm, variety of crops being grown, number of laborers, number of pieces of equipment, and quantity of production factors data desired to be recorded. Each data button 10 will have a unique identification code. In step 48, each of the data button identification codes will be entered into loader 30. In step 50, verification of whether the identification code information entered into the loader 30 is correct occurs. CPU 24 sends a request to the operation verify the information entered in step 48. If the information is not correct, CPU 24 will send the program back to step 48 to enter the correct identification code from the data button 10. After the correct identification code has been entered into the loader 30, the identification code information is sent to CPU 24, in step 52. In step 54, CPU 24 processes the identification code and then sends it to central memory 28 to be stored. After the identification code information is stored, CPU 24 asks whether there is another data button 10, in step 56. In step 58, if there is another data button, the program returns to step 48. If there are no additional data button 10s to record identification codes, the program advances to step 60. In step 60, the installation of each data button 10 on the farm. Steps 38–60 are also known as the initialization phase.

In step 62, the farmer selects a transferring apparatus 36 for purposes of transferring data between data buttons 10 and loader 30. In step 64, production factor data, such as time, date, temperature, is transferred from a data button 10 possessing such data or from loader 30 into transferring apparatus 36. Each data button 10 has a microchip capable of storing, sending and receiving information. For example, a data button 10 that provides temperature could be directly connected to a thermometer that sends electronic signals containing temperature information to the data button 10. The data button 10 could also be one of several data buttons 10 preprogrammed with a set temperature or temperature range. In step 64, for example, the temperature data is transferred from the data button 10 to the transferring apparatus 36 by way of electrophysical contact. The transferring apparatus 36 has a microchip that will receive the temperature data, from either data button 10 setup explained above, when the transferring apparatus 36 is brought into contact with each data button 10. Energy from the transferring apparatus 36 is siphoned by the data button 10, to operate its microchip in order to send the temperature data. Data from CPU 24 can also be sent to transferring apparatus 36 through loader 30 electrophysically.

The production factor data is then, in step 66, transferred from the transferring apparatus 36 to each data button 10 on the farm that is potentially affected by the production factor. The data is transferred by way of transferring apparatus 36 being brought into contact with the respective data button 10. At almost the same time, in step 68, all information stored on each data button 10 is received into transferring apparatus 36. An example of data transferred in step 68 would be seed information, or fertilizer, herbicide and fungicide application information. This information would have been transferred to respective data buttons 10 attached to field validation posts 14 by an applicator or worker. In step 70, the production factor data received into transferring apparatus 36 is transferred into loader 30. In step 72, the data transferred in step 70 to the loader 30, is sent to CPU 24. The information sent to CPU 24, in turn, in step 74, is sent to central memory 28 to be stored. Steps 62–74 are known as the data recordation phase.

Step 76 is an intermediary step wherein the method explained so far is interrupted if there is a query. If there is no query, the program, in step 78, advances to step 96. If there is a query, such as, for example, when a crop was last sprayed with a pesticide, the query is entered into data receiving apparatus 22, in step 80.

In step 82, the query is sent to CPU 24, which, in turn, in step 84, accesses information stored in central memory 28. In step 86, information in response to the query is retrieved from the information accessed in step 82. In step 88, the information retrieved in step 86 is organized for display purposes. In step 90, the information organized in step 88 is displayed on display apparatus 32. In step 92, there is an opportunity to request that the displayed information be printed on printer 34. If no printing is requested, the program, in step 93, moves to step 96. If a printing of the display is requested, the display is printed on printer 34, in step 94. After the display is printed, the program moves on to step 96. Steps 76–94 are known as the query phase.

In the End Phase, starting with step 96, the program inquires whether there are additional production factors to be entered into the transferring apparatus 36. If yes, in step 98, the program returns to step 64. If no, the program, in step 100, returns to step 76.

While the present method and system has been described in the context of managing the production of a crop, the method is equally applicable to other agricultural uses such as potentially increasing sugar content in corn and sugar beets, oil content in soybeans or red dye content in beets. The application of data buttons to monitor and record data about production factors that potentially influence crop yield and crop characteristics is a method that can be altered in a specific configuration without departing from the principles of the invention. I claim all modifications coming within the scope and spirit of the following claims.

It is claimed:

1. A system for enabling farmers and producers to record, store and retrieve information about production data related to farming, the system comprising:

data receiving means for receiving background information about the farm, the background information including information about specific attributes of the farm and information about objects on the farm;

at least one data button, the data button having means for receiving, storing and sending information;

a loader means for receiving information;

a transferring means for transferring production factors information to and from the loader means and the data button, the transferring means electrophysically connected to each data button and the loader means at the time data is transferred;

a processing means for processing information received by the data receiving means and loader means, the processing means electrically connected to the loader means and data receiving means, the processing means including means for:

organizing information received by the data receiving means;

sending information received by the data receiving means;

accessing information received by the data receiving means;

organizing information received by the loader means;

sending information received by the loader means;

accessing information received by the loader means;

responding to a query, the query requesting that a certain arrangement of information be displayed, the query being entered through the data receiving means;

a memory storage means for storing information sent from the processing means, the memory storage means electronically connected to the processing means; and a displaying means for creating a display of the arrangement of information requested in the query, the display means electronically connected to the processing means.

2. The system as set forth in claim 1, wherein the processing means further includes means for comparing information stored in the memory storage means with information about another farm received by the data receiving means.

3. The system as set forth in claim 2, wherein the data receiving means comprises at least one keyboard.

4. The system as set forth in claim 3, wherein the transferring means comprises a hand-held, electro-physical data transferring device.

5. The system as set forth in claim 4, wherein the data button acquires operational energy from the data transferring means.

6. The system as set forth in claim 4 further comprising a printing means for printing the information contained in the display means.

7. The system as set forth in claim 5 further comprising a printing means for printing the information contained in the display means.

8. A method of enabling farmers and producers to record, store and retrieve current information about production factor and historical data related to a farm, the method comprising the steps of:

entering background information about the farm into a data receiving apparatus, the background information including information about specific attributes of the farm and information about objects on the farm;

sending the background information to a central processing unit;

storing the background information on a central memory;

entering an identification code provided on a data button into a loader, the data button being located on an object on the farm;

sending the identification code to the central processing unit;

storing the identification code on the central memory;

entering object information about each data button into a transferring apparatus, the transferring apparatus having means for receiving, storing and transferring data;

transferring the object information of each data button from the transferring apparatus to the corresponding data button;

entering production factor data into the transferring apparatus;

storing production factor data in the transferring apparatus;

transferring the production factor data stored in the transferring apparatus to each data button adjacent an object potentially affected by the production factor;

transferring information stored on each data button into the transferring apparatus;

transferring the information in the transferring apparatus to the loader;

sending the information transferred to the loader to the central processing unit;

storing the information sent to the central processing unit in the central memory;

responding to a query entered into the data receiving apparatus; and displaying a response to the query on a display apparatus.

9. The method as set forth in claim 8 further including the step of printing the response to the query.

10. The method as set forth in claim 9 further including the step of storing a copy of information stored in the central memory onto a portable memory storage device.

* * * * *